United States Patent
Liao et al.

(10) Patent No.: US 6,704,264 B2
(45) Date of Patent: Mar. 9, 2004

(54) EMERGENCY EJECTION STRUCTURE FOR OPTICAL DISK DRIVE

(75) Inventors: Cheng-Yao Liao, Taipei (TW); Hui-Chu Huang, Taipei (TW)

(73) Assignee: Lite-On It Corporation, Taipei (TW)

(*) Notice: Subject to any disclaimer, the term of this patent is extended or adjusted under 35 U.S.C. 154(b) by 39 days.

(21) Appl. No.: 10/228,993

(22) Filed: Aug. 26, 2002

(65) Prior Publication Data

US 2003/0152010 A1 Aug. 14, 2003

(30) Foreign Application Priority Data

Feb. 8, 2002 (TW) ........................... 91201745 U

(51) Int. Cl.[7] .................................. G11B 33/02
(52) U.S. Cl. ............................................ 369/75.1
(58) Field of Search .................... 369/75.1, 75.2, 369/77.1, 77.2, 79

(56) References Cited

U.S. PATENT DOCUMENTS 4,412,320 A * 10/1983 Yamakawa ............... 369/79
4,439,850 A * 3/1984 Takahara et al. ......... 369/77.2
2002/0131355 A1 * 9/2002 Lin ........................... 369/75.1

* cited by examiner

Primary Examiner—George J. Letscher
(74) Attorney, Agent, or Firm—Thomas, Kayden, Horstemeyer & Risley

(57) ABSTRACT

An optical disk drive has a lid an emergency ejection hole. An opening is defined in the lid. The emergency ejection structure comprises a locking element having a locking hook and an ejection lever, a safety element movably disposed under the emergency ejection hole, and an electromagnetic unit for generating magnetic field to attract the safety element in the optical disk drive. The locking hook is fitted the opening and keep the lid closed. With magnetic force, electromagnetic unit attracts the safety element. The locking hook can engage with the opening when the optical disk drive is connected to electrical power that enables the electromagnetic unit to attract and hold the safety element. The locking hook can disengage from the opening when the optical disk drive is disconnected from electrical power, enabling the electromagnetic unit to release the safety element.

5 Claims, 3 Drawing Sheets

US 6,704,264 B2

EMERGENCY EJECTION STRUCTURE FOR OPTICAL DISK DRIVE

BACKGROUND OF THE INVENTION

1. Field of the Invention

The present invention relates to an emergency ejection structure for an optical disk drive, and in particular to an emergency ejection structure for ensuring safety of the optical disk drive and users.

2. Description of the Prior Art

FIG. 1 is a perspective view of a conventional external optical disk drive 1a. The conventional external optical disk drive 1a has a lid 10a. When opening the lid 10a, disks can be placed on or removed from the optical disk drive. The optical disk drive 1a sometimes fails to function properly or the host computer crashes. In order to open the lid 10a and remove the disk from the optical disk drive 1a, the optical disk drive 1a has installed an emergency ejection structure.

Referring to FIG. 2, the conventional emergency ejection structure includes a locking element 11a for locking the lid 10a of the disk drive 1a and keeping the lid 10a closed. The optical disk drive 1a has an emergency ejection hole 12a, and the lid 10a has an opening 15a. The locking element 11a has a locking hook 14a, and when the lid 10a is closed, the locking hook 14a is fitted to the opening 15a. The locking element 11a has an ejection lever 13a corresponding to the emergency ejection hole 12a. To perform ejection manually, the user can insert a suitable device into the emergency ejection hole 12a to push the ejection lever 13a downwardly in order to disengage the locking hook 14a from the opening 15a, as shown in FIG. 3.

However, when the disk drive 1a is in use, the lid 10a can be opened if the emergency ejection structure is inadvertently actuated. The disk may be ejected because the spindle motor (not shown) of optical disk drive 1a spins at a high speed. It may do damage to the disk and impair the user.

Consequently, the present invention provides an emergency ejection structure for an external optical disk drive. The emergency ejection structure ensures personnel safety and prevents disk or drive from being damaged due to inadvertent emergency ejection of optical disk.

SUMMARY OF THE INVENTION

It is an object of the invention to provide an emergency ejection structure for an optical disk drive. The optical disk drive has a lid and an emergency ejection hole. The lid has an opening. The emergency ejection structure comprises a locking element having a locking hook and an ejection lever, a safety element movably disposed under the emergency ejection hole, and an electromagnetic unit for generating magnetic field in the optical disk drive. The locking hook is fitted to the opening of the lid and keeps the lid closed. With magnetic force, the electromagnetic unit attracts the safety element.

On the one hand, the locking hook cannot disengage from the opening when the optical disk drive is connected to electric power that enables the electromagnetic unit to attract and hold the safety element.

On the other hand, the locking hook can disengage from the opening when the optical disk drive is disconnected to electric power, enabling the electromagnetic unit to release the safety element.

A detailed description will be given by the following embodiments with reference to the accompanying drawings.

BRIEF DESCRIPTION OF THE DRAWINGS

The present invention can be fully understood from the following detailed description and preferred embodiment with reference to the accompanying drawings in which.

DETAILED DESCRIPTION OF THE INVENTION

The following detailed description of the best contemplated modes of carrying out the invention. This description is not to be taken in a limiting sense, but is made merely for the purpose of illustrating general principles of embodiments of the invention. The scope of the invention is best defined be the appended claims.

Figure 1:
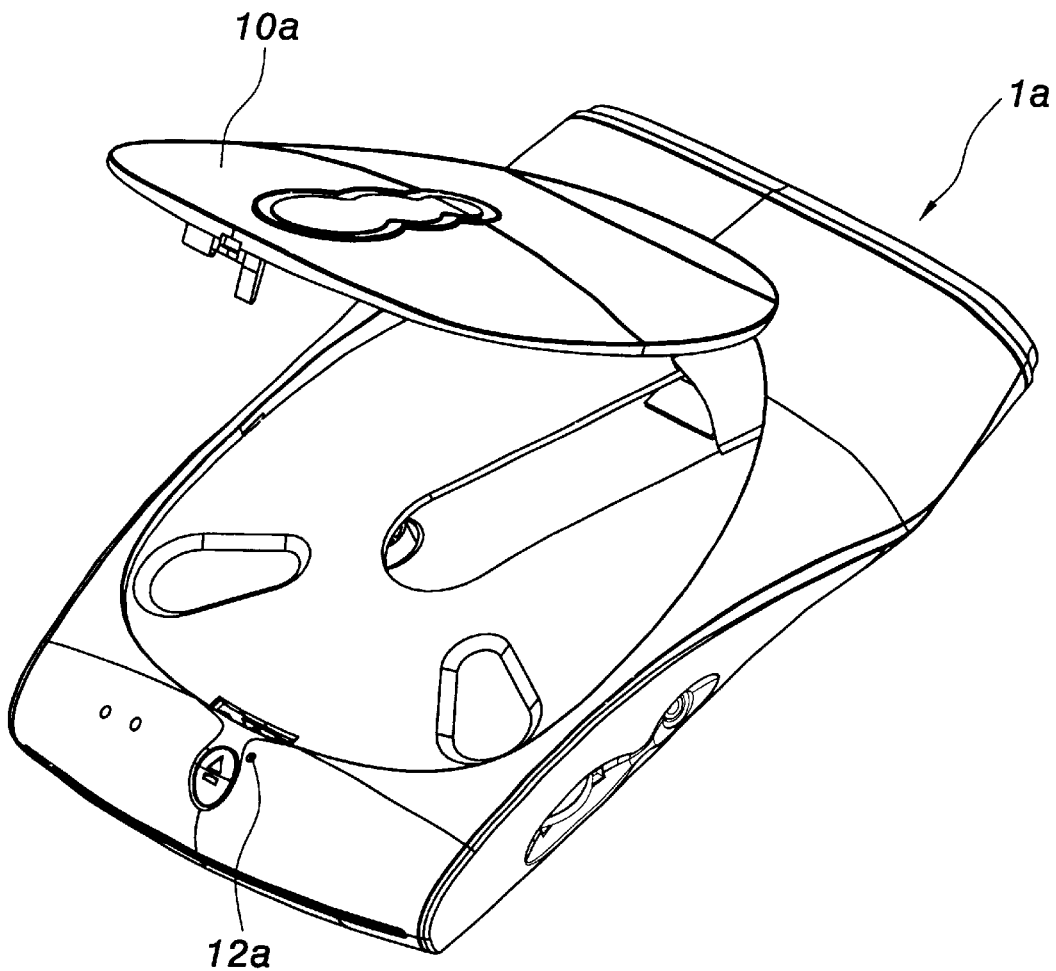
FIG. 1 is a perspective view of a conventional external optical disk drive with a lid opened.
Figure 2:
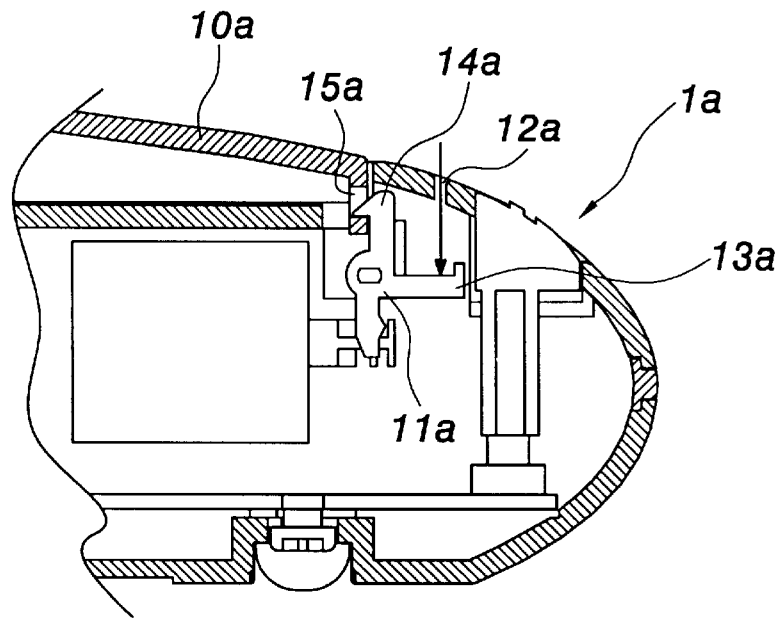
FIG. 2 is a partial cross section of FIG. 1 showing a locking element is fitted to an opening of the lid.
Figure 3:
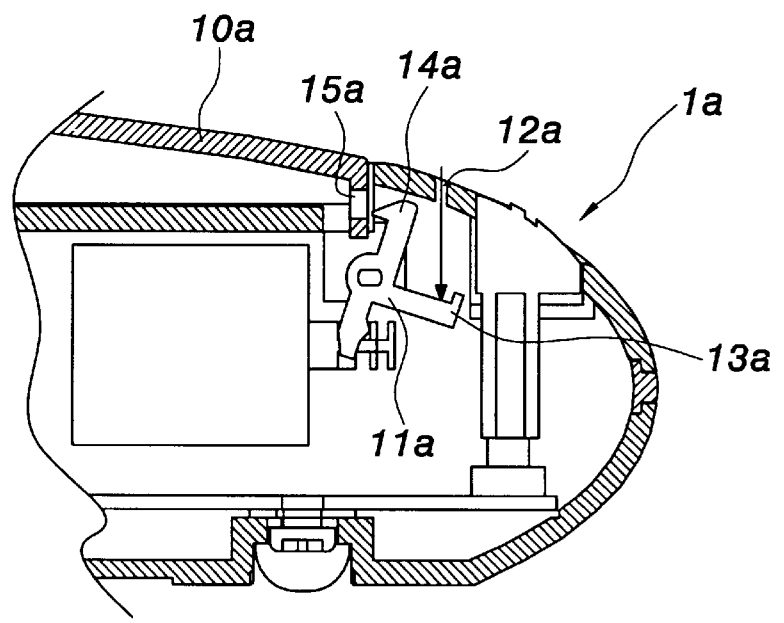
FIG. 3 is a partial cross section of FIG. 1 showing that the locking element disengages from the opening.
Figure 4:
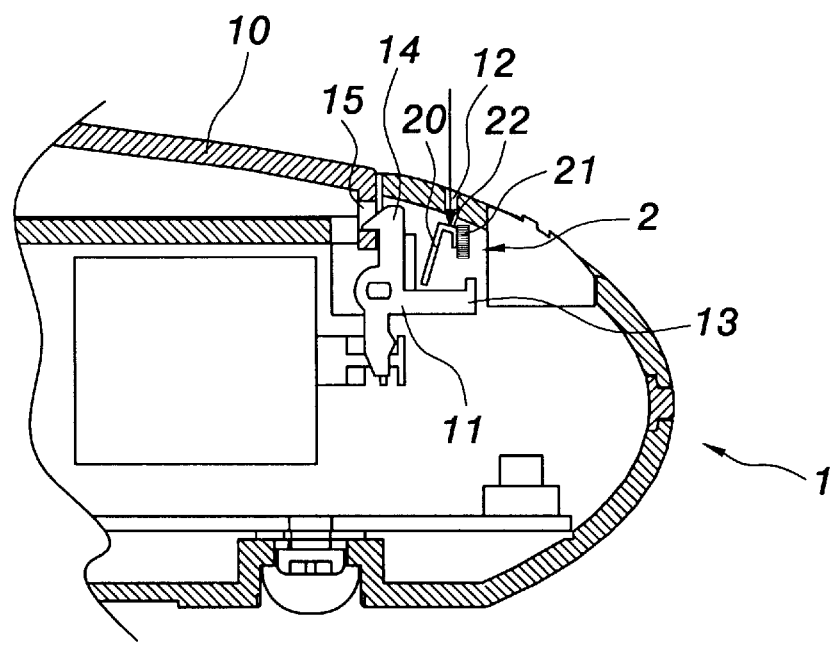
FIG. 4 is a partial cross section of an emergency ejection structure according to one embodiment of the present invention showing that an electromagnetic unit attracts and holds a safety element.
Figure 5:
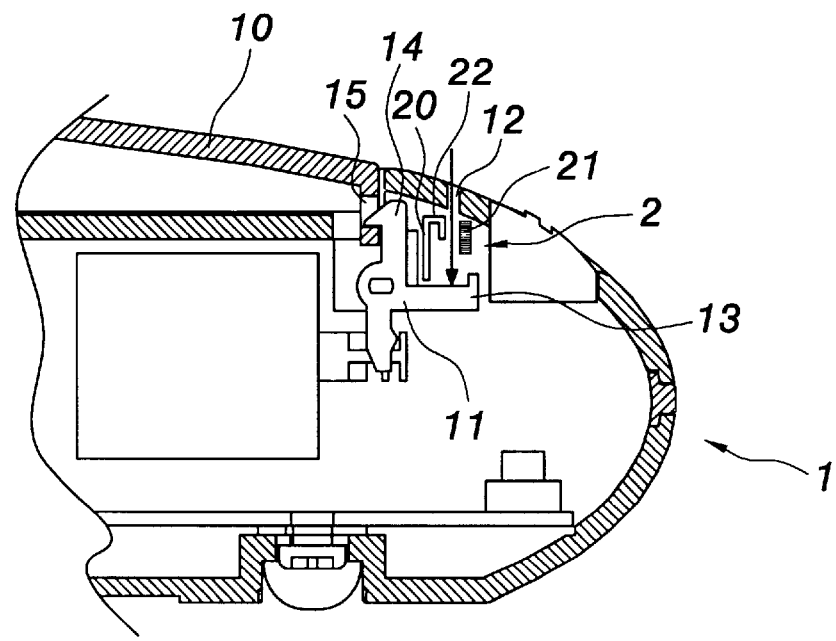
FIG. 5 is a partial cross section of the emergency ejection structure of the present invention showing that the electromagnetic unit releases the safety element.

Referring to FIG. 4 and FIG. 5, the emergency ejection structure 2 is disposed in the external optical disk drive 1. The optical disk drive 1 has a lid 10 and an emergency ejection hole 12. The lid 10 has an opening 15. The emergency ejection structure 2 comprises a locking element 11, a safety element 20 and an electromagnetic unit 21. The locking element 11 has a locking hook 14 and an ejection lever 13. The locking hook 14 is locked with the opening 15 of the lid 10. Thus, the lid 10 is closed. The ejection lever 13 corresponds to the emergency ejection hole 12, and can be pushed downwardly to open the lid 10. When the user inserts a suitable device through the emergency ejection hole 12 to push the ejection lever 13 downwardly, the locking hook 14 of the locking element 11 disengages from the opening 15 of the lid 10. Then, the lid 10 can be immediately opened and the user can remove the disk (not shown) from the optical disk drive 1.

In order to prevent emergency ejection due to inadvertent actuation, when the optical disk drive 1 is in use, the emergency ejection structure 2 employs the safety element 20 and the electromagnetic unit 21 to prevent the users to open the lid 2.

The safety element 20 is a resilient member that is made of metallic material and movably disposed near the emergency ejection hole 12. A blocking portion 22 is formed with the safety element 20 and has an extension portion extending downwardly therefrom.

The electromagnetic unit 21 is wound with coils (not shown) and disposed corresponding to the safety element 20. When the optical disk drive 1 is in use or is connected to electrical power, the electromagnetic unit 21 generates magnetic field and attracts the metal element 20 by magnetic force. Meanwhile, the blocking portion 22 of the safety element 20 is located beneath the emergency ejection hole 12, as shown in FIG. 4. In addition, the extension portion of the emergency ejection structure 2 is attached to the electromagnetic unit 21 by magnetic force. Because the blocking potion 22 of the safety element 20 is near emergency ejection hole 12, the safety element 20 prevents the user from inserting a slim object into emergency ejection hole 12. At the same time, if the user inserts a slim object into the emergency ejection hole 12, then the extension portion of the safety element 20 is pressed against the electromagnetic unit 21 and prevents the slim object from going further. Thus, the emergency ejection structure 2 or the ejection lever 13 cannot be actuated when the disk drive 1 is connected to electrical power.

To remove the disk from the optical disk drive 1 manually, the user must make sure that the optical disk drive 1 is disconnected from the electric power. Then, the electromagnetic unit 21 fails to generate magnetic field because there is no electrical power to the disk drive 1. Thus, the safety element 20 is not affected by the electromagnetic unit 21 and returns to the original position by its resilient force or another resilient elements (not shown) connected thereto, as shown in FIG. 5. At this time, the blocking portion 22 of the safety element 20 is not located beneath the emergency ejection hole 12 any more. The user can thus insert a suitable slim object to push the ejection lever 13 downwardly in order to disengage the locking hook 14 from the opening 15. The lid 10 can be opened and the user can remove the disk from the optical disk drive 1. Meanwhile, because the spindle motor (not shown) of the optical disk drive 1 stops, the disk is at rest and does not eject at high speed, possibly causing injury to the user.

To conclude, when the optical disk drive 1 is connected to electrical power, the electromagnetic unit 21 generates the magnetic field and attracts the safety element 20 by the magnetic force. Thus, the blocking portion 22 of the safety element 20 is located beneath the emergency ejection hole 12. At this time, the ejection lever 13 of the locking element 11 cannot be actuated due to the existence of safety element 20. On the other hand, when the optical disk drive 1 is disconnected from electrical power, the electromagnetic unit 21 fails to generate magnetic force and attract the safety element 20. The safety element 20 returns to the original position by resilient force or another resilient element connected thereto. At this time, the ejection lever 13 of the locking element 11 can be pushed downwardly by the slim object.

In addition, the present invention can also be employed in a tray-type optical disk drive.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An emergency ejection structure for an optical disk drive having a lid and an emergency ejection hole, the lid having an opening, comprising:

a locking element having a locking hook and an ejection lever, wherein the locking hook is locked with the opening of the lid;

a safety element movably disposed under the emergency ejection hole; and an electromagnetic unit for generating magnetic field and attracting the safety element by magnetic force when the disk drive is connected to an electrical power;

whereby the locking hook can engage with the opening when the optical disk drive is connected to electrical power that enables the electromagnetic unit to attract and hold the safety element, whereby the locking hook can disengage from the opening when the optical disk drive is disconnected from electrical power, enabling the electromagnetic unit to release the safety element.

2. The emergency ejection structure as claimed in claim 1, wherein the safety element is a resilient member and is made of metallic material.

3. The emergency ejection structure as claimed in claim 1, further comprising a resilient element connected to the safety element for providing return force to the safety element.

4. The emergency ejection structure as claimed in claim 1, wherein the safety element further comprises a blocking portion for preventing the ejection lever from actuation.

5. The emergency ejection structure as claimed in claim 1, wherein the electromagnetic unit is wound with coils and generate magnetic field to attract the safety element by magnetic force.

* * * * *